United States Patent
Ohno et al.

(10) Patent No.: US 7,052,882 B2
(45) Date of Patent: May 30, 2006

(54) **GLUCAN DERIVED FROM *ASPERGILLUS***

(75) Inventors: Naohito Ohno, Hachioji (JP);
Yoshiyuki Adachi, Hachioji (JP);
Noriko Miura, Hachioji (JP); Hiroshi Tamura, Musashi-murayama (JP);
Norihiko Ogura, Higashi-yamato (JP)

(73) Assignee: Seikagaku Corporation, Tokyo (JP)

( * ) Notice: Subject to any disclaimer, the term of this patent is extended or adjusted under 35 U.S.C. 154(b) by 88 days.

(21) Appl. No.: 10/232,526

(22) Filed: Sep. 3, 2002

(65) Prior Publication Data

US 2003/0113877 A1    Jun. 19, 2003

(30) Foreign Application Priority Data

Aug. 31, 2001 (JP) .................... P. 2001-264921

(51) Int. Cl.
*C12P 19/04* (2006.01)
*C08B 37/00* (2006.01)

(52) U.S. Cl. .................. 435/101; 435/72; 435/7.31; 536/123.12; 536/127

(58) Field of Classification Search ............... 435/101, 435/72, 7.31; 536/123.12, 127
See application file for complete search history.

(56) References Cited

U.S. PATENT DOCUMENTS 4,946,450 A * 8/1990 Erwin ..................... 604/294
6,284,885 B1 * 9/2001 Tamura et al. ......... 536/123.12

FOREIGN PATENT DOCUMENTS

WO    WO 99/11671    * 3/1999

OTHER PUBLICATIONS

Sandula et al (Carbohydrate Polymers 38:247-253 (1999)).*

* cited by examiner

*Primary Examiner*—Francisco Prats
(74) *Attorney, Agent, or Firm*—Sughrue Mion, PLLC

(57) ABSTRACT

A glucan extracted by oxidation treatment of microorganism cells belonging to the genus *Aspergillus* under alkaline conditions; a glucan obtained by dissolving an aqueous solvent-insoluble fraction of the glucan in an aprotic polar solvent; a glucan obtained by dissolving the glucan in a urea solution; methods for obtaining the glucan; a method for measuring an amount of (1→3)-β-D-glucan in a sample using the glucan; and a (1→3)-β-D-glucan measuring kit containing the glucan.

4 Claims, 3 Drawing Sheets

GLUCAN DERIVED FROM *ASPERGILLUS*

BACKGROUND OF THE INVENTION

1. Field of the Invention

The present invention relates to glucans obtained by treating microorganism cells belonging to the genus *Aspergillus* by specified methods and to methods for using them.

2. Brief Description of the Background Art

Fungal (1→3)-β-D-glucans show various biological activities such as activation of reticuloendothelial system including production of various cytokines from macrophage, activation of complement system, antitumor activities (e.g., lentinan prepared from *Lentinus edodes*, schizophyllan prepared from *Schizophyllum commune* and the like are now on the market as medicaments having antitumor activities) and the like (*Yakugaku Zasshi*, 120(5), 413–431 (2000)).

Deep-seated mycosis is one of the serious infectious diseases in the field of medical treatment. Since fungal (1→3)-β-D-glucan is eluted in blood when the infection with a fungus occurs, the deep-seated mycosis can be detected by measuring (1→3)-β-D-glucan in blood.

In addition, there are reports that not only (1→3)-β-D-glucan is regarded as one of the causative agents of allergic respiratory disorder, but also (1→3)-β-D-glucan of a microorganism entered into the living body increases the activity of endotoxin, so that its interfusion into blood as a foreign matter is extremely undesirable. Thus, contamination of medicaments, medical tools and the like with (1→3)-β-D-glucan is also becoming a serious problem from the viewpoint of medical treatment, so that detection of (1→3)-β-D-glucan is seriously required in the field of medical treatment.

Also, the sensitivity and accuracy of the detection of (1→3)-β-D-glucan are influenced by the sensitivity and accuracy of the reaction of a standard substance with a (1→3)-β-D-glucan detection reagent (e.g., limulus reagent, reagent containing a factor in phenoloxidase precursor cascade or the like). WO 99/11671 describes a method for extracting (1→3)-β-D-glucan having accurate reactivity with a (1→3)-β-D-glucan detection reagent from a microorganism belonging to the genus *Candida*, and the (1→3)-β-D-glucan obtained thereby. However, its sensitivity and the like were not sufficient.

SUMMARY OF THE INVENTION

An object of the present invention is to provide a substance having higher sensitivity to a (1→3)-β-D-glucan detection reagent.

This and other objects of the present invention have been accomplished by glucans obtained by treating a microorganism belonging to the genus *Aspergillus* by specified methods.

DETAILED DESCRIPTION OF THE INVENTION

Figure 1:
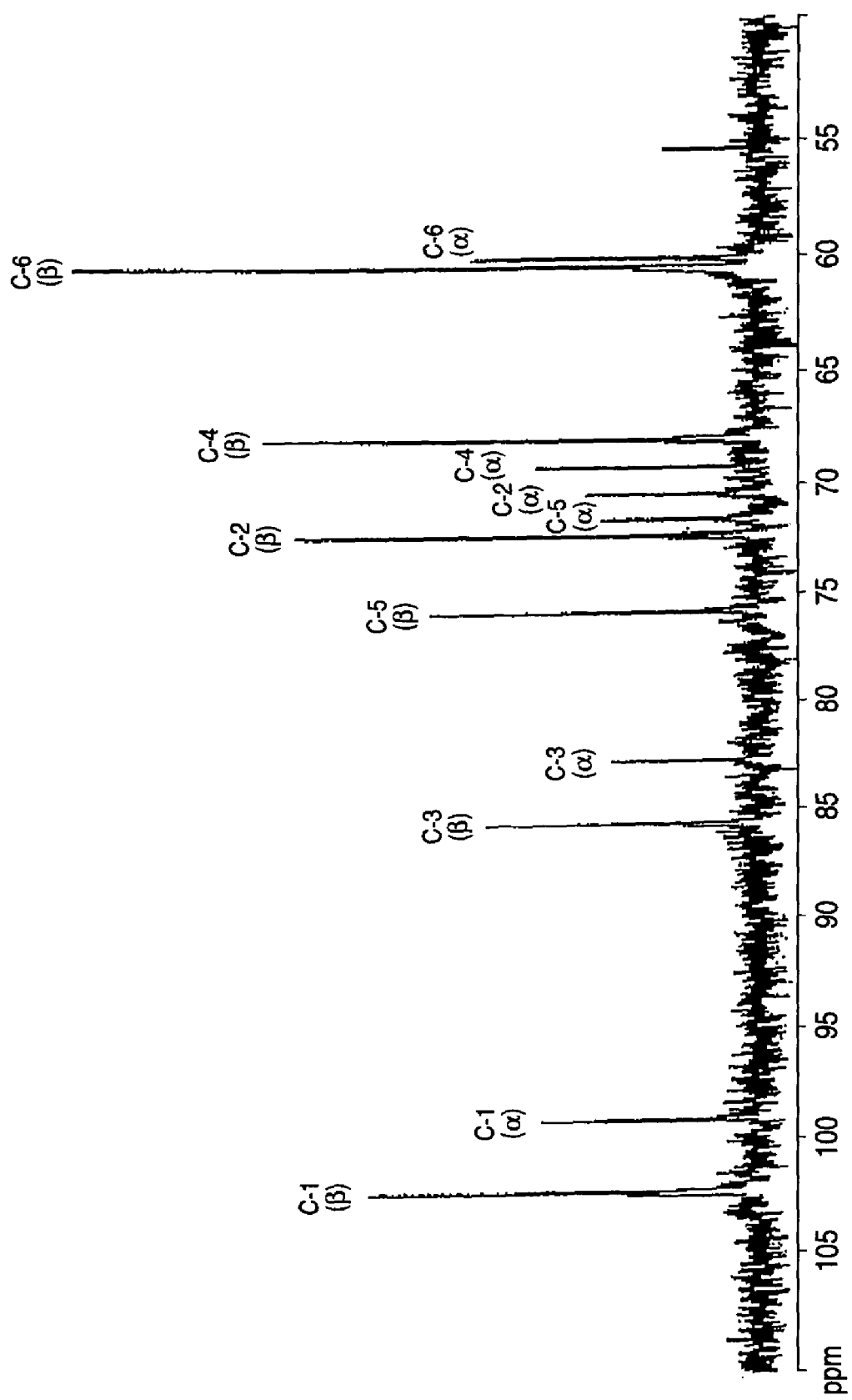
FIG. 1 shows a $^{13}$C-NMR chart of glucan 1-o-2.

Taking the above problems into consideration, the present inventors have conducted intensive studies and found as a result of the efforts that a glucan having excellent physiological activities can be obtained by treating microorganism cells belonging to the genus *Aspergillus* by specified methods, and the glucan shows surprising reactivity with a (1→3)-β-D-glucan detection reagent, and thus the present invention has been accomplished.

Specifically, the present invention relates to the following (1) to (16):

(1) A glucan extracted by oxidation treatment of microorganism cells belonging to the genus *Aspergillus* under alkaline conditions.

(2) The glucan according to (1), wherein the oxidation treatment is carried out using a hypochlorite.

(3) A glucan which is extracted by oxidation treatment of microorganism cells belonging to the genus *Aspergillus* under alkaline conditions, and is soluble in an aprotic polar solvent.

(4) The glucan according to (3), wherein the aprotic polar solvent is dialkyl sulfoxide.

(5) A glucan which is extracted by oxidation treatment of microorganism cells belonging to the genus *Aspergillus* under alkaline conditions, and is soluble in a urea solution.

(6) A glucan which is extracted by oxidation treatment of microorganism cells belonging to the genus *Aspergillus* under alkaline conditions, and is soluble in an aprotic polar solvent and a urea solution.

(7) A method for obtaining a glucan, which comprises subjecting microorganism cells belonging to the genus *Aspergillus* to oxidation treatment under alkaline conditions to thereby extract a glucan.

(8) The method according to (7), wherein the oxidation treatment is carried out using a hypochlorite.

(9) The method according to (7), which further comprises dissolving an aqueous solvent-insoluble fraction of the obtained glucan in an aprotic polar solvent.

(10) The method according to (9), wherein the aprotic polar solvent is dialkyl sulfoxide.

(11) The method according to (7) or (9), which further comprises dissolving the obtained glucan dissolved in a urea solution.

(12) A method for measuring an amount of (1→3)-β-D-glucan in a sample, which comprise reacting the sample with a (1→3)-β-D-glucan detection reagent, wherein the glucan of any one of (1), (3), (5) and (6) is used as a standard substance.

(13) The method according to (12), wherein the (1→3)-β-D-glucan detection reagent is a limulus reagent or a reagent containing a factor in phenoloxidase precursor cascade.

(14) A (1→3)-β-D-glucan measuring kit, which comprises the glucan of any one of (1), (3), (5) and (6) as a standard substance.

(15) The kit according to (14), which further comprises a (1→3)-β-D-glucan detection reagent.

(16) The kit according to (15), wherein the (1→3)-β-D-glucan detection reagent is a limulus reagent or a regent containing a factor in phenoloxidase precursor cascade.

The present invention is explained below in detail based on the embodiments of the present invention.

(1) Substance 1 of the Present Invention

The substance 1 of the present invention is a glucan extracted by oxidation treatment of microorganism cells belonging to the genus *Aspergillus* under alkaline conditions.

The substance 1 of the present invention may be any substance derived from microorganism cells belonging to the genus *Aspergillus*, but is preferably derived from cell walls. The microorganism is not particularly limited, so long as it belongs to the genus *Aspergillus*. Preferred examples include *Aspergillus fumigatus* (hereinafter referred to as "*A. fumigatus*") (IFO (Institute for Fermentation, Osaka; 17–85, Juso-honmachi, 2-chome, Yodogawa-ku, Osaka 532–8686, Japan)-4400, IFO 30870, etc.), *Aspergillus niger* (hereinafter referred to as "*A. niger*") (IFO-6342, etc.), *Aspergillus oryzae* (hereinafter referred to as "*A. oryzae*") (IFO-30103, etc.), and the like.

Regarding the microorganism belonging to the genus *Aspergillus* of the present invention, it is preferable to obtain the microorganism by a liquid culture method in a medium having specified medium components in order to reduce contaminants in the obtained glucan, but it may also be a solid culture method. For example, a microorganism cultured on a shaker using a medium which is used in a general fungal culturing can be recovered by usual separation means, such as filtration, centrifugation treatment or the like, and then subjected to the oxidation treatment described later. However, substances other than glucan are also contained in the microbial cells and extracted by the extraction operation. Accordingly, in order to obtain (1→3)-β-D-glucan having higher sensitivity to a (1→3)-β-D-glucan detection reagent, it is more preferable to remove impurities as many as possible using "defatted and dried cells" prepared by defatting and dehydrating the microorganism isolated from the medium using a water-soluble organic solvent such as acetone or the like.

The "alkaline conditions" according to the substance 1 of the present invention are a pH of approximately from 7 to 13, preferably from 8 to 12. By employing such a condition, mannan, protein and the like contained in the microbial cells can be digested and denatured. But it is not particularly limited to the above range, so long as it is possible to remove mannan and protein contained in the microorganism from the substance 1 of the present invention by digesting and denaturing them by other method.

The "oxidation treatment" according to the substance of the present invention can be carried out using an appropriate oxidizing agent (e.g., hypochlorite, periodate, etc.). As the oxidizing agent, a hypochlorite (e.g., lithium hypochlorite, sodium hypochlorite, potassium hypochlorite, etc.) is particularly preferable, and sodium hypochlorite (hereinafter referred to as "NaClO") is most preferable.

For example, when an NaClO solution is used as the oxidizing agent, it is preferable to mix an appropriate volume of the NaClO solution with the defatted and dried cells of a microorganism belonging to the genus *Aspergillus* and then proceed the reaction with stirring. In this case, various oxides having a different degree of oxidation are obtained depending on the temperature and treating period of time, and it is more preferable to generally carry out the reaction at a temperature of from 0 to 37° C., preferably from 2 to 8° C., for example, at 4° C., for 1 to 24 hours, preferably 5 to 15 hours, although not particularly limited thereto. It should be understood by those skilled in the art that the reaction time can be changed depending on changes in various conditions.

Since the substance 1 of the present invention is insoluble in the oxidation treatment solution, water-soluble fractions as impurities can be separated by recovering the insoluble fraction in the oxidation treatment solution. Recovery of the insoluble fraction can be carried out by a usual solid-liquid separation means such as filtration, etc. or a well known general method such as centrifugation, etc. Among these, centrifugation treatment is particularly preferable.

In addition, it is preferable to recover the insoluble fraction after desalting the oxidation treatment mixture by desalting means such as dialysis or the like and washing of the insoluble fraction with water and then carrying out the solid-liquid separation.

It is possible to obtain the following substances 2 and 3 of the present invention having higher sensitivity to a (1→3)-β-D-glucan detection reagent by further subjecting the substance 1 of the present invention to respective purification treatments.

(2) Substance 2 of the Present Invention

The substance 2 of the present invention is a glucan which is extracted by oxidation treatment of microorganism cells belonging to the genus *Aspergillus* under alkaline conditions, and is soluble in an aprotic polar solvent.

The substance 2 of the present invention is a glucan obtained from the substance 1 of the present invention by dissolving it in an aprotic polar solvent and fractionating and isolating a fraction which is insoluble in aqueous solvents such as water and the like, which is a mixture of an α-glucan and a β-glucan such as a (1→3)-β-D-glucan or the like, and respective characteristic peaks of both glucans are observed when analyzed by $^{13}$C-NMR or the like nuclear magnetic resonance. The above dissolution can be accelerated by carrying out an ultrasonic treatment at the time of the dissolution It is preferable that the aprotic polar solvent described above is a water-soluble organic solvent which retains reactivity of the substance 2 of the present invention with a (1→3)-β-D-glucan detection reagent and also can dissolve an α-glucan and a β-glucan. Examples of the aprotic polar solvent include dialkyl sulfoxide, dialkylformamide and hexaalkylphosphoramide. Specific examples include dimethyl sulfoxide (hereinafter referred to as "DMSO"), diethyl sulfoxide, dimethylformamide, hexamethylphosphoramide and the like. Among these, DMSO is particularly preferable. After dissolving the substance 1 of the present invention in the aprotic polar solvent, powdery substance 2 of the present invention can be obtained by removing insoluble matter which is not dissolved in the aprotic polar solvent by centrifugation or the like, adding a polar organic solvent such as ethanol or the like to the supernatant to precipitate the substance 2 of the present invention, recovering the substance 2 of the present invention as a precipitate using known solid-liquid separation technique such as centrifugation or the like, and then dehydrating and drying the recovered material with a water-miscible organic solvent such as acetone or the like.

(3) Substance 3 of the Present Invention

The substance 3 of the present invention is a glucan which is extracted by oxidation treatment of microorganism cells belonging to the genus *Aspergillus* under alkaline conditions, and is soluble in a urea solution.

In the substance 3 of the present invention, a characteristic peak of (1→3)-β-D-glucan can be observed by $^{13}$C-NMR and the like.

After dissolving the substance 1 or the substance 2 of the present invention in the urea solution and preferably carrying out a heat treatment, powdery substance 3 of the present invention can be obtained by removing insoluble matter by a solid-liquid separation means such as centrifugation or the like, adding a polar organic solvent such as ethanol or the like to the supernatant to precipitate the substance 3 of the present invention, recovering the substance 3 of the present invention as a precipitate using a known solid-liquid separation means such as centrifugation or the like, and then dehydrating and drying the recovered material with a water-miscible organic solvent such as acetone or the like.

Also, although the substance 1 or the substance 2 of the present invention can be dissolved in the urea solution at room temperature, in order to quicken the dissolution, the dissolution is preferable carried out under heating conditions, preferably under heating and pressurization conditions (e.g., 20 minutes of treatment at 121° C. in an autoclave).

In carrying out the purification of the substance 3 of the present invention, an aqueous solution containing urea is preferable as the urea solution. The concentration of urea in the urea solution is preferably from 2 to 12 M, more preferably from 3 to 10 M, and most preferably from 4 to 8 M, although not limited to the above concentration, so long as the characteristic peak of (1→3)-β-D-glucan can be substantially observed in the purified substance 3 of the present invention by $^{13}$C-NMR.

(4) Measuring Method of the Present Invention

The measuring method of the present invention is a method for measuring an amount of a (1→3)-β-D-glucan in a sample by a limulus reagent or a reagent containing a factor in phenoloxidase precursor cascade, using the substance 1, 2 or 3 of the present invention as the standard substance.

As the limulus reagent used in the measuring method of the present invention, any reagent can be used, so long as it contains a reaction factor of factor G system obtained using a lysate extracted from amoebocyte (a hemocyte) of a limulina as the starting material, and generally used in a limulus test (gelling method, nephelometry method). Examples of the limulus reagent include usual lysates prepared by known methods such as Limulus polyphemus, Tachypleus tridentatus, Tachypleus gigas, Tachypleus (Carcinoscorpius) rotundicauda, etc. (e.g., J. Biochem., 80, 1011–1021 (1976)); (1→3)-β-D-glucan-specific lysates from which the reaction of an endotoxin sensitive factor (factor C) is excluded or inactivated (JP-A-4-285859); synthetic substrate process limulus reagents obtained by a synthetic substrate method such as (1→3)-β-D-glucan-specific reagents prepared by adding synthetic substrates to these lysates (JP-A-4-285859), etc.; and the like.

The reagent containing a factor in phenoloxidase precursor cascade for use in the measuring method of the present invention is not particularly limited, so long as it is a reagent which contains a factor in (1→3)-β-D-glucan system reaction obtained using the body fluid of arthropods and the like as the starting material, but commercially available reagents which is prepared from the body fluid of silkworm and can react with a peptidoglycan and (1→3)-β-D-glucan (e.g., SLP Reagent (manufactured by Wako Pure Chemical Industries, Ltd.)) can also be used.

Also, as the detection method of the reaction in the measuring method of the present invention which uses a reagent containing a factor in phenoloxidase precursor cascade, known methods, namely methods for measuring enzyme activities of an expressed enzyme, such as benzoyl-arginine ethyl ester hydrolase (BAEEase), prophenol oxidase activating enzyme (PPAE), phenol oxidase (PO) and the like or methods for measuring expression periods of these enzyme activities, may be used. For example, methods for measuring an activation degree of PO (a method for measuring a formed quinoline pigment, a method for measuring a melanin pigment formed by the oxidation of L-β-(3,4-dihydroxyphenyl)alanine (DOPA) and the like) as described in JP-A-1-142466 and JP-A-7-114707, a method for measuring BAEEase activity, and a method for measuring PPAE activity as described in JP-A-7-184690 may be used.

Also, the limulus reagent and the reagent containing a factor in phenoloxidase precursor cascade as described above may be in any form such as liquid, powder, solid or the like.

(1→3)-β-D-Glucan in body fluids such as serum, plasma, tissue fluid and the like, as well as in water samples, reagent samples, medicament samples and samples obtained by their sampling during medicament production steps and the like can be measured by using the method of the present invention.

(5) Kit of the Present Invention

The kit of the present invention is a kit for measuring (1→3)-β-D-glucan comprising at least the substance 1, 2 or 3 of the present invention as a standard substance.

The kit of the present invention is a kit for carrying out the measuring method of the present invention, which comprises the above-described substance 1, 2 or 3 of the present invention as the standard substance. It is preferable that the kit of the present invention further contains a (1→3)-β-D-glucan detection reagent, such as a limulus reagent or a reagent containing a factor in phenoloxidase precursor cascade, as the measuring reagent for carrying out the measuring method of the present invention. In addition, other materials such as distilled water having no contamination of (1→3)-β-D-glucan ((1→3)-β-D-glucan free), a 96 well microplate having no adsorption of (1→3)-β-D-glucan ((1→3)-β-D-glucan free) and the like may be included in the kit.

The present invention are described below based on examples.

EXAMPLE 1

Preparation of the Substance 1 of the Present Invention:

Each of A. fumigatus (IFO-4400 and IFO-30870), A. niger (IFO-6342) and A. oryzae (IFO-30103) was liquid-cultured (a jar fermentor was used; agitation speed: 400 rpm) at 27° C. for 48 to 72 hours in 5 liters of a C-limited medium (a medium containing sucrose as the carbon source) and then treated with acetone to obtain 16 to 20 g of dry cells (defatted and dried cells).

In 200 ml of 0.1 mol/liter NaOH, 2 g of the defatted and dried cells were suspended, and NaClO (sodium hypochlorite, Antiformin; manufactured by Wako Pure Chemical Industries) was added thereto to the respective effective chlorine concentrations of from 0.5 to 1.5%, followed by stirring at 4° C. overnight for oxidation degradation. Each of the thus obtained oxides was centrifuged at 3,000 rpm for 10 minutes to obtain a precipitate which was subsequently mixed with 200 ml of (1→3)-β-D-glucan free distilled water, stirred and centrifuged (3,000 rpm, 10 minutes), and then 200 ml of acetone was added to the resulting precipitate to thereby obtain the substance 1 of the present invention derived from respective fungal strains as dehydrated precipitates (the substance 1 of the present invention derived from A. fumigatus was named glucan 1-f, and in the same manner, the one derived from *A. niger* was named glucan 1-n, and the one derived from *A. oryzae* was named glucan 1-o (a product obtained by treating with hypochlorous acid having an available chlorine concentration of 1.5% was named glucan 1-o-1, and a product obtained by treating with hypochlorous acid having an available chlorine concentration of 0.5% was named glucan 1-o-2)). Each of the yields was about 350 mg.

Also, as controls, *Candida albicans* (IFO-1385) was subjected to the same method to prepare control substances (control 1: a substance obtained by treating with hypochlorous acid having an available chlorine concentration of 1.5% was named control 1-1, and a substance obtained by treating with hypochlorous acid having an available chlorine concentration of 0.5% was named control 1-2).

The yield and percent yield of each sample thus obtained and the available chlorine concentration used are as follows (Table 1).

TABLE 1

| Sample name | Available chlorine concentration (%) | Yield (mg) from 2 g of defatted and dried cells | Yield (%) |
| --- | --- | --- | --- |
| Control 1-1 | 1.5 | 176 | 8 |
| Glucan 1-o-1 | | 374 | 18.7 |
| Control 1-2 | 0.5 | 517 | 25.85 |
| Glucan 1-f (derived from IFO-4400) | | 751 | 37.6 |
| Glucan 1-f (derived from IFO-30870) | | 871 | 43.6 |
| Glucan 1-n | | 944 | 47.2 |
| Glucan 1-o-2 | | 640 | 32 |

EXAMPLE 2

Preparation of the Substance 2 of the Present Invention:

A total amount of each of glucans 1-f (derived from IFO-4400 and IFO-30870), 1-n and 1-o-2 obtained in Example 1 by treating 2 g of defatted and dried cells with an available chlorine concentration of 0.5% was mixed with 30 ml of DMSO and dissolved therein by ultrasonic treatment for 1 hour. A supernatant was obtained by centrifugation at 3,000 rpm for 10 minutes, 4 volumes of ethanol was added to the supernatant while stirring to effect precipitation of glucan, and then the precipitate was centrifuged at 15,000 rpm for 15 minutes to recover the precipitate. The precipitate was mixed with 100 ml of acetone, stirred and centrifuged at 3,000 rpm for 10 minutes to obtain a dehydrated precipitate which was then dried under a reduced pressure to obtain respective powders of the substance 2 of the present invention. The substance 2 of the present invention derived from glucan 1-f was named glucan 2-f, and in the same manner, the one derived from glucan 1-n was named glucan 2-n, and the one derived from glucan 1-o-2 was named glucan 2-o.

Controls were prepared by treating controls 1-1 and 1-2 (control derived from control 1-1 was named control 2-1, and another control derived from control 1-2 was named control 2-2).

The yield and percent yield of each sample thus obtained are as follows (Table 2).

TABLE 2

| Sample name | Yield (mg) from 2 g of defatted and dried cells | Yield (%) |
| --- | --- | --- |
| Control 2-1 | 174 | 8.7 |
| Control 2-2 | 512 | 25.6 |
| Glucan 2-f (derived from IFO-4400) | 599 | 30.0 |
| Glucan 2-f (derived from IFO-30870) | 733 | 36.6 |
| Glucan 2-n | 934 | 46.7 |
| Glucan 2-o | 468 | 23.4 |

EXAMPLE 3

Preparation of the Substance 3 of the Present Invention:

The glucan 1-o-2 obtained in Example 1 was suspended in a urea solution prepared by dissolving 4 M or 8 M urea in distilled water, to give a final concentration of 10 mg/ml, and treated at 121° C. for 20 minutes in an autoclave. Thereafter, the mixture was centrifuged at 10,000×g for 10 minutes, 4 volumes of ethanol was added to the thus recovered supernatant while stirring to precipitate a glucan, and then the precipitate was centrifuged at 15,000 rpm for 10 minutes to recover the precipitate. The precipitate was mixed with 100 ml of acetone, stirred and centrifuged at 3,000 rpm for 10 minutes to obtain a dehydrated precipitate which was then dried under a reduced pressure to obtain respective powders of the substance 3 of the present invention. The substance 3 of the present invention obtained by treating with 4 M urea solution was named glucan 3-o(4), and the other obtained by treating with 8 M urea solution was named glucan 3-o(8)

From 2 g of the defatted and dried cells, 134 mg of glucan 3-o(4) was obtained at a yield of 6.7%, and from 2 g of the defatted and dried cells, 171 mg of glucan 3-o(8) was obtained at a yield of 8.6%.

EXAMPLE 4

Analysis by $^{13}$C-NMR:

Each of glucan 1-o-2 and glucan 3-o(8) was dissolved in DMSO-d$_6$ (manufactured by Merck, F.R. Germany) and subjected to a $^{13}$C high resolution NMR (DRX500 and analyzing software XWIN-NMR, Bruker, Germany) (analyzing temperature: 70° C.).

Figure 2:
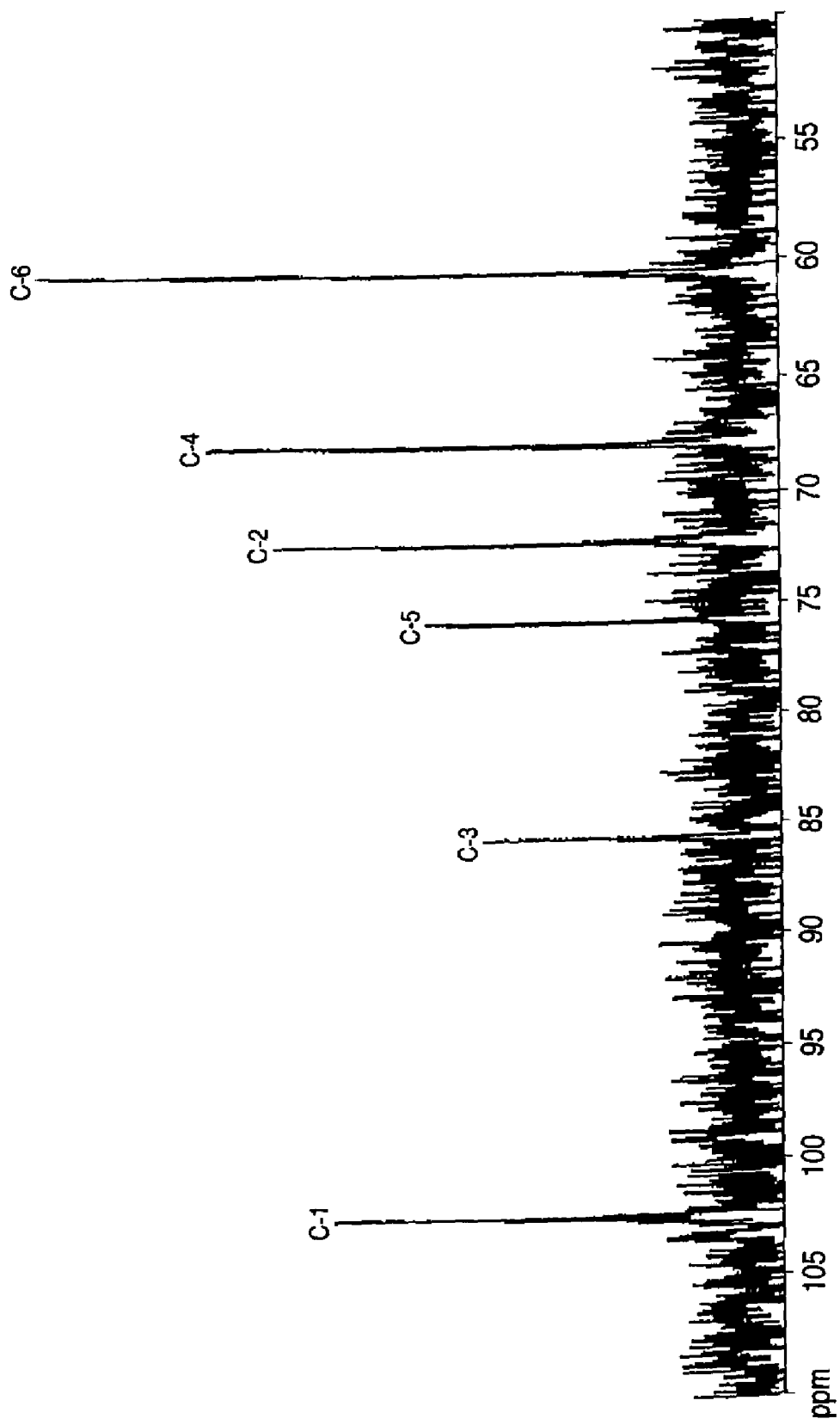
FIG. 2 shows a $^{13}$C-NMR chart of glucan 3-o(8).

It was found from the $^{13}$C chemical shift (Table 3) that glucan 1-o-2 contains both of an α-glucan and a β-glucan, and it was found that glucan 3-o(8) is constituted by a β-1,3 linkage ($^{13}$C-NMR spectrum is shown in FIG. 1: glucan 1-o-2: FIG. 1, glucan 3-o(8): FIG. 2).

TABLE 3

| | $^{13}$C-NMR chemical shift | | | | | |
| --- | --- | --- | --- | --- | --- | --- |
| | C-1 | C-2 | C-3 | C-4 | C-5 | C-6 |
| α-1,3 | 99.1 | 70.4 | 82.7 | 69.2 | 71.5 | 60.1 |
| β-1,3 | 102.8 | 72.6 | 86.1 | 68.3 | 76.2 | 60.8 |

EXAMPLE 5

Measurement of G Factor Activating Ability:

G factor activity was measured using glucan 1-o-2, glucan 3-o-(4), glucan 3-o-(8), control 2-2 and pachyman derived from *Pachyma hoelen* (manufactured by Seikagaku Corporation).

That is, DMSO was added to each glucan to give a concentration of 1 mg/ml DMSO. Each glucan was swelled by allowing it to stand for 24 hours, and then only glucan 1-o-2, glucan 3-o-(4) and glucan 3-o-(8) in which insoluble matter was observed were boiled at 100° C. for 3 minutes.

A soluble fraction was recovered from each glucan solution and diluted 10 times with distilled water. The mixture was further diluted with distilled water to prepare 10-fold serial dilutions.

The G factor activity of each sample was measured using a G factor measuring kit (FUNGITEC G-MK: manufactured by Seikagaku Corporation) in accordance with the instructions (Table 4).

TABLE 4

| Sample name | mABs/min |
|---|---|
| Control 2-2 | 2.0 |
| Glucan 1-o-2 | 2.0 |
| Glucan 3-o(4) | 3.0 |
| Glucan 3-o(8) | 1.9 |
| Pachyman | 0.5 |

Also, the measurements of glucan 3-o-(4), glucan 3-o-(8) and glucan 2-o were carried out using a standard curve prepared by pachyman.

Figure 3:
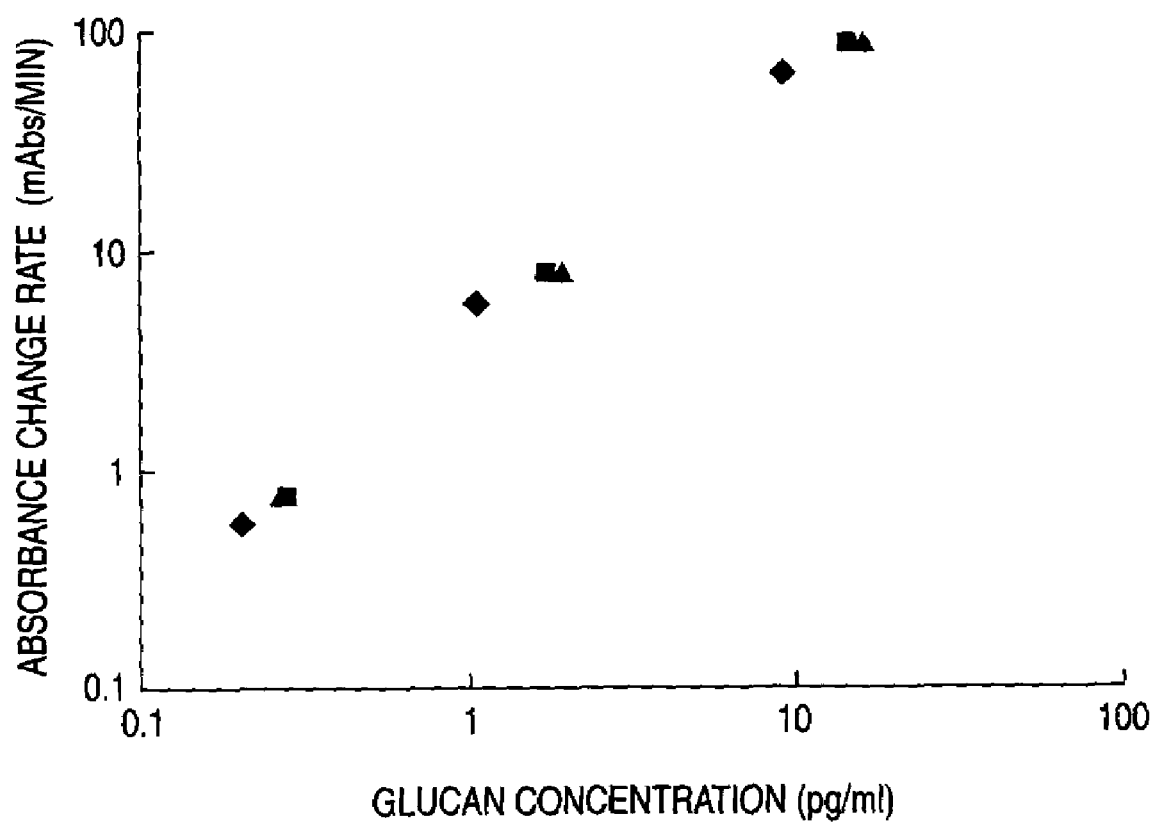
FIG. 3 is a graph showing G factor activating ability of glucan 3-o(4), glucan 3-o(8) and glucan 2-o. The horizontal axis indicates a glucan content (pg/ml: per saccharide content) measured using pachyman as standard. The vertical axis indicates absorbance change rate (mAbs/min.). The diamond, the triangle, and the square indicate 2-o sample, 3-o(8) sample, and 3-o(4) sample, respectively.

Specifically, 1 mg of each glucan was dissolved in 1 ml of DMSO, and the diluent was diluted to give a final concentration of 100 pg/ml, 10 pg/ml or 1 pg/ml. The G factor activating ability of each of the diluents was measured using FUNGITEC G-MK (manufactured by Seikagaku Corporation). The results showed that the calculated concentration of (1→3)-β-D-glucan based (1→3)-β-D-glucan derived from pachyman was different from the actual concentrations of glucan 3-o-(4), glucan 3-o-(8) and glucan 2-o. That is, it was demonstrated that when a glucan derived from pachyman is used as a standard substance in the measurement of a glucan derived from *Aspergillus*, a value which is clearly different from the concentration of a glucan which has been actually contaminated is obtained, and therefore, when a glucan in a sample which might be infected with *Aspergillus*, it is preferable that the substance of the present invention is used as the standard substance (see FIG. 3).

EXAMPLE 6

(1→3)-β-D-Glucan Measuring Kit:
(1) Glucan 3-o(8) (freeze-dried powder prepared after dissolving 4 mg of dextran and 4 mg of sodium borohydride in 1 ml of 0.01 M NaOH solution containing 500 pg/ml the glucan: put in vials)
(2) (1→3)-β-D-Glucan-specific limulus reagent
(3) 96 Well microplate ((1→3)-β-D-glucan free) 1 plate
(4) Distilled water ((1→3)-β-D-glucan free) 10 ml Measurement:

Using a sample prepared by dissolving powder of lentinan in DMSO and adjusting to 1 mg/ml with distilled water, measurement was carried out by the above kit of the present invention using the method of Example 5. As a result, stable measured values were obtained with no dispersion.

EXAMPLE 7

Influence of Human Peripheral Blood Mononuclear Cells and Polymorphonuclear Neutrophils on the Production of IL-8:

Peripheral blood was collected from a peripheral vein of a healthy volunteer, and mononuclear cells (PBMC) and polymorphonuclear neutrophils (PMN) were separated therefrom by a density gradient centrifugation method and suspended in 10% autologous plasma-RPMI 1640 medium. Respective cells were inoculated into polypropylene tubes at a density of $2.0 \times 10^6$ cells/ml, stimulated with control 1-2 and glucan 1-o-2 obtained in Example 1 and glucan 3-o(8) obtained in Example 3 (100 µg/ml) and then cultured at 37° C. for 12 hours in a 5% $CO_2$ incubator. The IL-8 concentration in the thus obtained culture supernatants was measured by the ELISA (PBMC: Table 5, PMN: Table 6). A group to which glucan was not added was used as a negative control. As a result, it was revealed that the substances of the present invention have potent IL-8 production accelerating ability.

TABLE 5

| Sample name | IL-8 concentration (ng/ml) |
|---|---|
| Negative control | 0.71 |
| Control 1-2 | 118.32 |
| Glucan 1-o-2 | 136.92 |
| Glucan 3-o(8) | 55.79 |

TABLE 6

| Sample name | IL-8 concentration (ng/ml) |
|---|---|
| Negative control | 32.21 |
| Glucan 1-o-2 | 3866.85 |
| Glucan 3-o(8) | 3814.91 |

While the present invention has been described in detail and with reference to specific embodiments thereof, it will be apparent to one of skill in the art that various changes and modifications can be made therein without departing from the spirit and scope thereof. All references cited herein are incorporated in their entirety.

This application is based on Japanese application No. 2001-264921 filed on Aug. 31, 2001, the entire content of which is incorporated hereinto by reference.

What is claimed is:

1. A method for obtaining a glucan having a β-1,3 linkage, which comprises subjecting microorganism cells belonging to the genus *Aspergillus* to oxidation treatment using an oxidizing agent under alkaline conditions to thereby obtain a glucan, and
   dissolving an aqueous solvent-insoluble fraction of the obtained glucan in an aprotic solvent to thereby obtain a second glucan and dissolving the obtained second glucan in a urea solution to thereby obtain said glucan having a β-1,3 linkage.

2. The method according to claim 1, wherein the oxidizing agent is a hypochlorite or a periodate.

3. The method according to claim 1, wherein the oxidation treatment is a hypochlorite.

4. The method according to claim 1, wherein the aprotic polar solvent is dialkyl sulfoxide.

* * * * *